United States Patent
Spruce et al.

(10) Patent No.: US 9,822,763 B2
(45) Date of Patent: Nov. 21, 2017

(54) METHOD AND APPARATUS FOR PROTECTING WIND TURBINES FROM EXTREME EVENTS

(75) Inventors: Chris Spruce, Leatherhead (GB); Christopher Palmer, Hampshire (GB); Robert Bowyer, London (GB)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 964 days.

(21) Appl. No.: 14/115,283

(22) PCT Filed: May 3, 2012

(86) PCT No.: PCT/DK2012/050149
§ 371 (c)(1), (2), (4) Date: Jan. 21, 2014

(87) PCT Pub. No.: WO2012/152280
PCT Pub. Date: Dec. 15, 2012

(65) Prior Publication Data
US 2014/0140843 A1   May 22, 2014

Related U.S. Application Data

(60) Provisional application No. 61/483,070, filed on May 6, 2011.

(30) Foreign Application Priority Data

May 6, 2011   (DK) ................................. 2011 70221

(51) Int. Cl.
*F03D 7/04*   (2006.01)
*F03D 7/02*   (2006.01)

(52) U.S. Cl.
CPC ............. *F03D 7/04* (2013.01); *F03D 7/0264* (2013.01); *F03D 7/042* (2013.01);
(Continued)

(58) Field of Classification Search
CPC ............ F03D 7/04; F03D 7/043; G01S 17/95; B64C 27/32; G01F 1/34
See application file for complete search history.

(56) References Cited

U.S. PATENT DOCUMENTS 4,585,341 A   4/1986   Woodfield
5,357,795 A   10/1994   Djorup
(Continued)

FOREIGN PATENT DOCUMENTS

EP   1988284 A1   11/2008
EP   2230637 A1   9/2010
WO   2011/014712 A2   2/2011

OTHER PUBLICATIONS

International Search Report and Written Opinion, PCT/DK2012/050149, dated Jul. 30, 2012.
Danish Search Report, DK PA 2011 70221, dated Feb. 17, 2012.

*Primary Examiner* — Mark Laurenzi
*Assistant Examiner* — Shafiq Mian
(74) *Attorney, Agent, or Firm* — Patterson + Sheridan, LLP

(57) ABSTRACT

A wind turbine has a Lidar device to sense wind conditions upstream of the wind turbine. Wind speed signals from the wind turbine are processed to detect an extreme operating gust. The detection is performed by differentiating the axial wind velocity and filtering for a period of time. On detection of extreme operating gust the system controller takes necessary evasive action which may include shutting down the turbine or varying the blade pitch angle.

17 Claims, 3 Drawing Sheets

(52) U.S. Cl.
CPC ..... *F05B 2270/309* (2013.01); *F05B 2270/32* (2013.01); *F05B 2270/321* (2013.01); *F05B 2270/322* (2013.01); *F05B 2270/404* (2013.01); *F05B 2270/8042* (2013.01); *Y02E 10/723* (2013.01)

(56) References Cited

U.S. PATENT DOCUMENTS

| | | | |
|---|---|---|---|
| 7,772,713 B2* | 8/2010 | Huang | F03D 7/0224 |
| | | | 290/44 |
| 2006/0033338 A1* | 2/2006 | Wilson | F03D 1/0608 |
| | | | 290/44 |
| 2006/0140764 A1* | 6/2006 | Smith | F03D 7/0224 |
| | | | 416/103 |
| 2007/0086893 A1 | 4/2007 | Pedersen | |
| 2009/0060740 A1* | 3/2009 | Stiesdal | F03D 7/0224 |
| | | | 416/41 |
| 2010/0180694 A1* | 7/2010 | Ely | G01W 1/10 |
| | | | 73/861.42 |
| 2010/0237617 A1* | 9/2010 | Vyas | F03D 7/043 |
| | | | 290/44 |

* cited by examiner

METHOD AND APPARATUS FOR PROTECTING WIND TURBINES FROM EXTREME EVENTS

FIELD OF THE INVENTION

This invention relates to wind turbines, and in particular, to the advance detection of upstream extreme wind conditions and the control of wind turbines in response to such detected conditions.

BACKGROUND OF THE INVENTION

It is important for a wind turbine to have advance knowledge to the condition of the wind which will shortly arrive at the turbine. Such knowledge gives the turbine controller sufficient time to adjust operating parameters, such as blade pitch angle or rotor speed, to match the oncoming conditions. This may be done for a variety of reasons. At lower wind speeds it is important to maximize the energy that can be extracted by the wind by setting parameters such as blade pitch angle to an optimum position. At higher wind speeds it is important to adjust turbine parameters to avoid operation under conditions which might lead to damage. Wind turbines have a rated power and when this power output is exceeded, the blade pitch angle and other operating parameters will be adjusted to reduce the amount of energy that is extracted from the wind. Wind turbines also need to be designed to withstand extreme operating conditions. Typically, these extreme conditions are rare single events or a small number of cumulative events which cause large, often unbalanced, loads on the wind turbine and will damage the turbine or reduce the overall lifetime of the turbine components, such as the blades or the gearbox by a significant amount.

Wind turbines are required to meet design parameters relating to extreme conditions as set out in International Standard IEC 61400-1 $3^{rd}$ Edition 2005. Section 6.3.2 of the standard defines a range of extreme wind conditions including extreme wind speed, extreme turbulence, and extreme gusts. In order to meet these requirements, wind turbines are required to be considerably over-engineered for normal use which greatly increases the amount of material used in turbine components such as the blades, the gearbox, and tower. This in turn increases the cost of wind turbine installation and the cost of energy generation.

Many proposals have been made for determining advance wind conditions. Generally these include sensors placed on the turbine which observe the upstream wind. One example is disclosed in EP-A-0970308 which discloses the use of a Lidar or similar remote sensing apparatus, mounted on the nacelle on the wind turbine, and sensing conditions several rotor diameters upstream of the turbine. Based on the sensed conditions the controller, which may be onboard the turbine or may be a separate wind power plant controller, can instruct an individual turbine or group of turbines to change their operating parameters before the sensed wind conditions arrive at the turbine. Another example is disclosed in US-A-20060140764, in which the Lidar is mounted in the rotor hub and has a plurality of look directions that are inclined away from the rotational axis of the hub so that rotation of the hub ensures a conical scan of the upstream air by the beam. The multiple look directions may also be achieved by using a number of dedicated Lidar systems and/or by using multiplexed Lidars or a beam splitter.

The known art provides a number of examples of advance sensing of wind conditions at a wind turbine. However, none of the art enables the detection of an extreme change in operating gusts and so none is able to protect the turbine from the consequence of such an extreme gust. The present invention aims to address this deficiency in the prior art.

Accordingly, the invention provides a control system for a wind turbine, comprising a sensing device mounted on the wind turbine to sense wind speed at a position upwind of the wind turbine; a controller for receiving and processing signals from the sensing device to detect an extreme operating gust upwind of the wind turbine, and for generating one or more control signals for varying an operating parameter of the wind turbine in response to the detected extreme operating gust, wherein the controller comprises a differentiator for differentiating a measure of the sensed wind speed.

The invention also provides a method of controlling a wind turbine. Comprising sensing wind speed at a position upwind of the wind turbine using a sensing device mounted on the turbine; receiving and processing signals from the sensing device at a controller to detect an extreme operating gust upwind of the wind turbine, wherein processing the signals comprises differentiating a measure of the sensed wind speed; and generating one or more control signals for varying an operating parameter of the wind turbine in response to the detected extreme operating gust.

Embodiments of the invention have the advantage that by differentiation of a suitable wind parameter, the onset of an extreme operating gust can be detected This enables the system controller to determine whether there is an extreme operating gust as defined by IEC 61400-1 discussed below and, thus, whether evasive action need be taken.

In one embodiment of the invention a filter may determine whether the output of the differentiator exceeds a predetermined value for a predetermined period of time. This has the advantage that instantaneous changes, which may be caused by turbulence, are not flagged as extreme events and an extreme event is only signalled when the detected change is maintained for a period of time.

The predetermined value may be dependent on the magnitude of the sensed wind speed. This is advantageous as the higher the wind speed, the lower the increase in velocity required to cause over-loading and damage. The predetermined period of time may be up to 3 seconds but typically 1 second.

In another embodiment of the invention, the sensed wind parameter is wind speed, and wind speed signals are resolved into axial, lateral and, optionally, vertical components. The differentiator acts on the axial component to determine the rate of change of axial wind speed. This approach is advantageous as it may provide a more accurate measure of gust speed. Alternatively, the differentiator may act on either the square root of the sum of the squares of lateral and axial wind components, or the square root of the sum of the squares of lateral, axial and vertical wind components.

The sensing device may sense the wind parameter at a plurality of distances upwind of the wind turbine. This has the advantage that changes in the oncoming wind front can be detected so that unnecessary evasive action is not taken when an extreme operating gust detected at a far distance degrades into an event that is not classed as extreme as it approaches the turbine.

In one embodiment, the sensing device is a multiple beam Lidar having multiple range gates.

The control signal generated by the controller in response to a detected extreme operating gust may comprise a turbine shutdown command or de-rate the turbine.

The invention also resides in a wind turbine having a control system as defined above.

BRIEF DESCRIPTION OF THE DRAWINGS

Embodiments of the invention will now be described, by way of example only, and with reference to the accompanying drawings, in which.

DESCRIPTION OF AN EMBODIMENT

International Standard IEC 61400-1 $3^{rd}$ Edition, sets out design requirements for wind turbines. Chapter 6.3.2 referred to above sets out and defines extreme wind conditions including wind shear events, peak wind speeds due to storms and rapid changes in wind speed and direction. The magnitude of an extreme operating gust is given by:

$$V_{gust} = \text{Min}\left\{1.35(V_{e1} - V_{hub}); 3.3\left(\frac{\sigma_1}{1 + 0.1\left(\frac{D}{\Lambda_1}\right)}\right)\right\}$$

$\sigma_1$ is given by $\sigma_1 = I_{ref}(0.75V_{hub}+b)$; b=5.6 m/s
$I_{ref}$ is expected value of hub height turbulence at a 10 min average wind speed of 15 m/s
$V_{hub}$ is the wind speed at hub height;
$V_{e1}$ is the expected extreme wind speed, averaged over 3 seconds, in a one year period;
D is the rotor diameter
$\Lambda_1$ is the turbulence scale parameter, according to $$\Lambda_1 = \begin{cases} 0.7z & z \leq 60 \text{ m} \\ 42 \text{ m} & z \geq 60 \text{ m} \end{cases}$$

The wind speed is defined as:

$$V(z,t) = \begin{cases} V(z) - 0.37V_{gust}\sin\left(\frac{3\pi}{T}\right)\left(1 - \cos\left(1 - \frac{2\pi}{T}\right)\right) & \text{for } 0 \leq t \leq T \\ V(z) & \text{otherwise} \end{cases}$$

Figure 1:
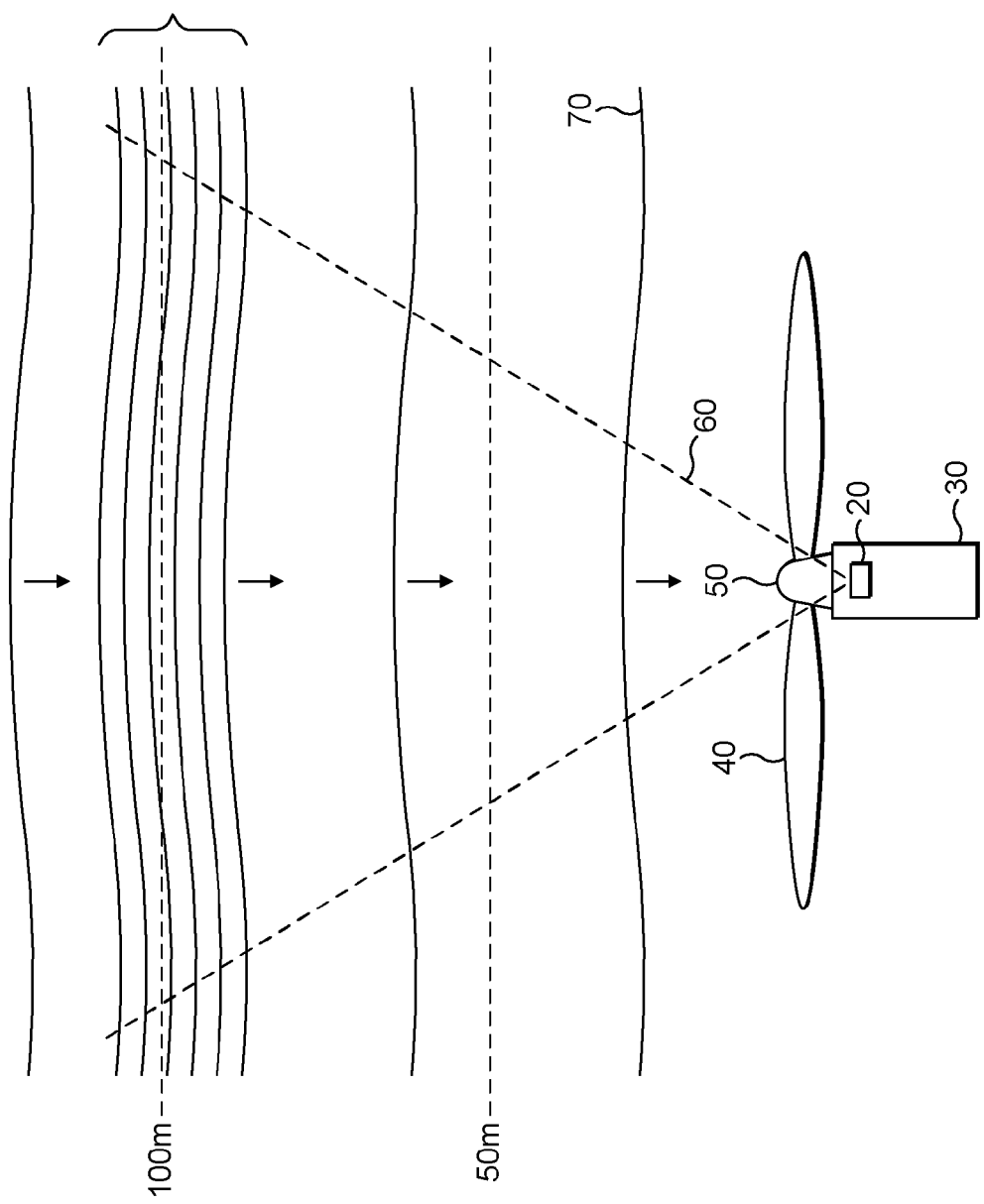
FIG. 1 is a schematic representation of a wind front including an extreme operating gust approaching a wind turbine

FIG. 1 illustrates an embodiment of the invention in which a Lidar or similar remote sensing apparatus 20 is mounted on a wind turbine 30. The wind turbine has blades 40 and a hub 50. The Lidar is mounted on the top surface of the turbine nacelle behind the rotor blades with a look direction extending generally in front of the blades. Alternative locations for the Lidar may be used, for example it may be mounted in hub to rotate with the hub to provide a conical scan. In FIG. 1 the look direction of the Lidar is shown by dashed lines 60. If not rotating with the hub, the Lidar may be provided with a separate scanning mechanism to provide a conical scan.

The Lidar may be a multiple gate range Lidar. This means that the Lidar is capable of sensing wind conditions at a plurality of distances from the wind turbine. This makes it possible to monitor the progress of a detected extreme event which may reduce in intensity as it approaches the wind turbine. This is important as it prevents evasive action being taken which is unnecessary if the severity of the event diminishes as it approaches the turbine. This may be done by Reacting to an extreme event is undesirable unless absolutely necessary and will cause a temporary loss in energy production. Sensing wind conditions relatively far from the turbine, however, is desirable as it gives more time for the turbine to react.

The Lidar is a multiple beam Lidar having at least two beams enabling it to sense the direction of movement. Although not essential, the Lidar may have three or more beams. These beams may be produced by any suitable method, for example using a single Lidar device with a beam splitter or multiplexer or by using a plurality of devices.

In FIG. 1 the Lidar 20 senses wind conditions at two ranges: 50 m and 100 m. This is exemplary only and a different number of distances may be chosen depending on the site and the number of ranges the chosen Lidar can measure. A wind front 70 is shown advancing on the turbine. This front changes in intensity at a point just before the 100 m range with the change being shown by a series of closely spaced lines 80 which represent a gust that falls within the definition of an extreme operating gust given above. At the 50 m range the Lidar does not detect the gust as it has not yet advanced that far towards the turbine. To enable whether the wind conditions detected at the 100 m range should be treated as an extreme operating gust, the wind turbine controller differentiates a measure of the wind speed signal provided by the Lidar to determine the rate of change of velocity. In practice, wind velocity signals will frequently change instantaneously by a large amount. However, in determining whether the change may be treated as an extreme event, it is important to determine whether this rate of change is maintained over a period of time, for example between about 0.5 to 2 seconds. This may be achieved by filtering the differentiated signal. If the signal reaches the threshold, then the controller can command evasive action. For a Lidar with multiple range gates, the controller may see whether the signal reaches the threshold (this threshold may vary range gate to range gate) for consecutive range gates, before commanding evasive action; again this is to reduce false triggers.

The controller looks at the detected wind speed and resolves that speed into lateral and axial velocity components with the lateral component representing the velocity of travel in a direction parallel to the plane of rotation of the wind turbine rotor, or normal to its axis of rotation, and the axial component representing the velocity parallel to the axis of rotation. Once the axial component has been determined it is differentiated to give the acceleration or rate of change of the axial component. If that acceleration exceeds the given threshold then action is taken. The threshold may be exceeded for a time period as mentioned above for the change in direction to be treated as an extreme change. The time period may depend on the magnitude of the acceleration so that a more rapidly changing wind front may need to be detected for a shorter time than one which only just exceeds the extreme event threshold for evasive action to be taken.

As an alternative to simply looking at the axial velocity component, the controller may look at the total wind speed change by determining $\sqrt{(V_{lat}^2 + V_{ax}^2)}$ where $V_{lat}$ is the lateral velocity and $V_{ax}$ is the axial velocity. Another alternative, if the lidar has 3 or more beams, is to use the absolute magnitude of the wind by calculating 29 $(V_{lat}^2+V_{ax}^2+V_{vert}^2)$ where $V_{vert}$ is the winds vertical velocity component.

Once the controller detects that the threshold has been exceeded for the predetermined time it commands the turbine to take evasive action. This may require a controlled shut down or an emergency shutdown of the turbine or some other action such as varying the blade pitch angle for the output power. The choice of evasive action will depend on the severity of the extreme event.

Figure 2:
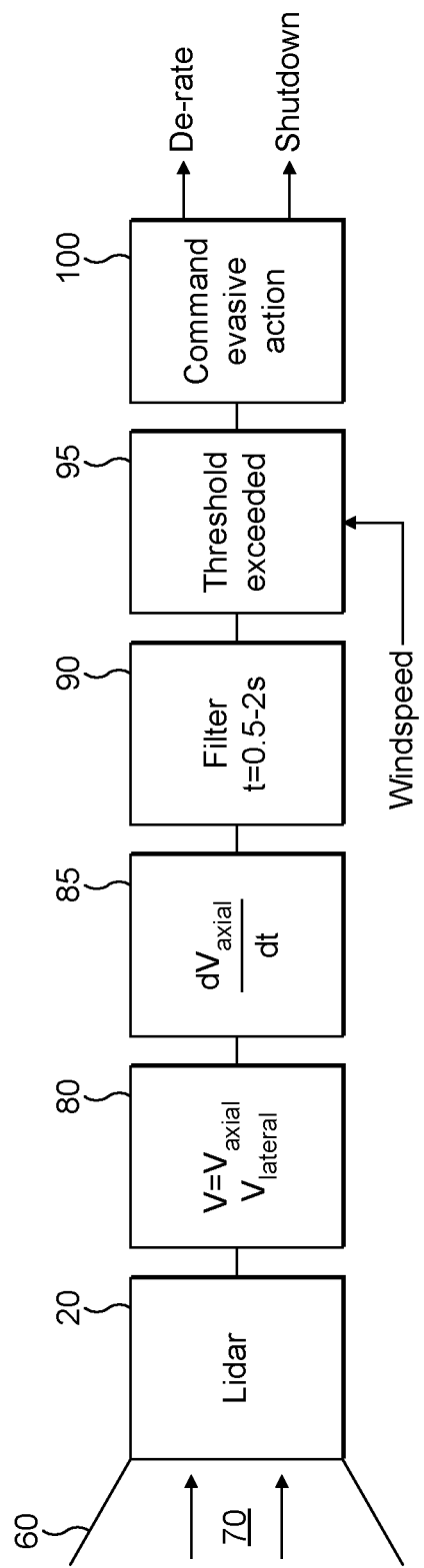
FIG. 2 shows a schematic diagram of a first embodiment of the invention; in which an extreme operating gust is detected on the basis of an axial component of velocity.
Figure 3:
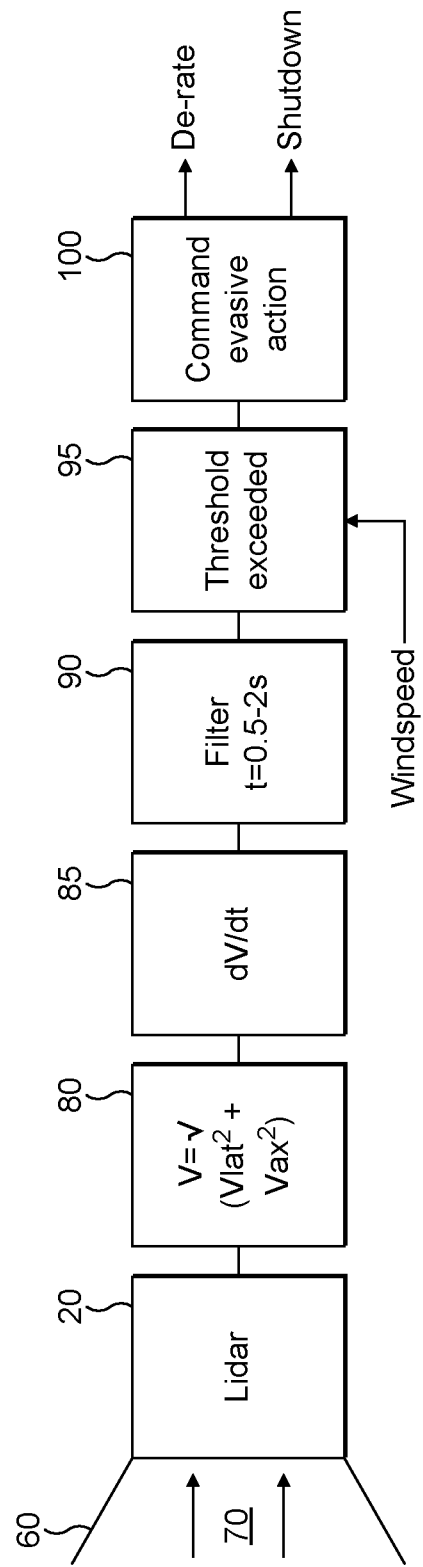
FIG. 3 shows a schematic diagram of a second embodiment of the invention.

FIGS. 2 and 3 illustrate the two embodiments described. In FIG. 2, a Lidar 20 mounted on a wind turbine emits a plurality of beams 60 to detect a parameter of the upwind wind front 70. In this embodiment the Lidar is a multibeam Lidar which has a plurality of beams or look directions, two being shown in the figure, and which detects the wind velocity. The controller acts on the velocity signal output by the Lidar 20 at 80 to resolve that velocity into two components: an axial velocity in the direction of the axis of rotation of the wind turbine rotor, and a lateral velocity being the velocity in the plane of the rotor or normal to the axis of rotation. A differentiator 85 acts on the axial velocity to provide an output $dV_{ax}/dt$ which is the axial acceleration of the wind and therefore indicative of a change in wind conditions which could indicate an extreme operating gust. That output is provided to a filter 90 which filters the signal over a predetermined period of time. In this embodiment, the predetermined period of time is 1 seconds. A threshold detector 95 receives the output from the filter and an indication of wind speed and determines whether the threshold has been exceeded. The threshold detector includes a look up table of thresholds at different wind speeds. At 100, where the output of the threshold detector indicates an extreme event, the controller commands an evasive action and causes a parameter of the wind turbine to be adjusted accordingly. This parameter may be a total shut down.

The embodiment of FIG. 3 is similar to that of FIG. 2 except that the controller acts on the signal output by the Lidar 20 at 80 to determine the wind velocity by resolving the wind speed measurement from the Lidar into its axial and lateral components and then taking the square root of the sum of the squares of the two components $\sqrt{(V_{lat}^2+V_{ax}^2)}$. The differentiator 85 acts on the resultant measure velocity to provide an output to the filter 90 $dV/dt$ which is a measure of acceleration of the wind and therefore indicative of an extreme operating gust.

Thus, embodiments of the invention enable extreme operating gusts to be detected and evasive action taken before the events arrive at the wind turbine. This is achieved by determining the acceleration of at least an axial component of the wind and the wind speed This enables the design constraints on the turbine to be changed so that they do not have to withstand loading caused by extreme changes in wind direction. This in turn enables wind turbine designers to use lighter components reducing the cost of wind turbines and thus the cost of producing energy. Alternatively, it enables existing components to be operated at higher rated output powers thus boosting the energy that can be extracted by a given turbine.

Many modifications to the embodiments described above are possible and will occur to those skilled in the art without departing from the invention. For example, the controller may be mounted on, and be part of, an individual turbine, or it may be a remote controller which controls multiple turbines which form a wind park or a part of a wind park.

The invention claimed is:

1. A control system for a wind turbine, comprising:
    a sensing device mounted on the wind turbine to sense wind speed at a position upwind of the wind turbine; and
    a controller for receiving and processing wind speed signals from the sensing device to detect an operating gust of wind having a differentiated wind speed that satisfies an extreme wind speed threshold upwind of the wind turbine, and for generating one or more control signals for varying an operating parameter of the wind turbine in response to the detected operating gust, wherein the controller comprises:
        a differentiator for generating the differentiated wind speed, wherein the differentiated wind speed is a rate of change of the wind speed signals received over a predetermined period of time; and
        a filter which determines whether the differentiated wind speed output by the differentiator exceeds the extreme wind speed threshold, wherein the extreme wind speed threshold is a predetermined value.

2. A control system according to claim 1, wherein the predetermined value is dependent on the magnitude of the received wind speed.

3. A control system according to claim 1, wherein the controller further comprises a splitter for resolving the wind speed signals received from the sensing device into axial and lateral components, and wherein the differentiator acts on the axial component.

4. A control system according to claim 1, wherein the controller further comprises a splitter for resolving the wind speed signals received from the sensing device into axial, lateral and vertical components, and wherein the differentiator acts on the axial component.

5. A control system according to claim 1, wherein the controller further comprises a splitter for resolving the wind speed signals received from the sensing device into axial and lateral components and wherein the differentiator acts on the square root of the sum of the squares of the axial and lateral components.

6. A control system according to claim 1, wherein the controller further comprises a splitter for resolving the wind speed signals received from the sensing device into axial, lateral and vertical components and wherein the differentiator acts on the square root of the sum of the squares of the axial, lateral and vertical components.

7. A control system according to claim 1, wherein the sensing device is a multiple beam Lidar.

8. A control system according to claim 7, wherein the Lidar is a multiple range gate Lidar.

9. A control system according to claim 1, wherein the control signal generated by the controller in response to the detected operating gust comprises a turbine shutdown command.

10. A control system according to claim 1, wherein the control signal generated by the controller in response to the detected operating gust, triggered over multiple range gates, comprises a turbine shutdown command.

11. A method of controlling a wind turbine, comprising:
    sensing wind speed at a position upwind of the wind turbine using a sensing device mounted on the turbine;
    receiving and processing wind speed signals from the sensing device at a controller to detect an operating gust of wind having a differentiated wind speed that satisfies an extreme wind speed threshold upwind of the wind turbine, wherein processing the wind speed signals comprises generating the differentiated wind speed, wherein the differentiated wind speed is a rate of change of the wind speed signals received over a predetermined period of time;

filtering the differentiated wind speed to determine whether the differentiated wind speed exceeds the extreme wind speed threshold, wherein the extreme wind speed threshold is a predetermined value; and generating one or more control signals for varying an operating parameter of the wind turbine in response to the detected operating gust.

12. A method according to claim 11, wherein the predetermined value is dependent on the magnitude of the received wind speed.

13. A method according to claim 11, further comprising resolving the received wind speed signals into axial and lateral component signals, and differentiating the axial component.

14. A method according to claim 11, further comprising resolving the received wind speed signals into axial, lateral and vertical component signals, and differentiating the axial component.

15. A method according to claim 11, further comprising resolving the received wind speed signals into axial and lateral component signals, and differentiating the square root of the sum of the squares of the axial and lateral components.

16. A method according to claim 11, further comprising resolving the received wind speed signals into axial, lateral and vertical component signals, and differentiating the square root of the sum of the squares of the axial, lateral and vertical components.

17. A method according to claim 11, wherein the control signal generated by the controller in response to a detected operating gust comprises a turbine shutdown command.

* * * * *